United States Patent [19]
Brockett

[11] 4,299,411
[45] Nov. 10, 1981

[54] PRESSURE-SENSITIVE RECORD MATERIAL
[75] Inventor: Bruce W. Brockett, Appleton, Wis.
[73] Assignee: Appleton Papers Inc., Appleton, Wis.
[21] Appl. No.: 45,768
[22] Filed: Jun. 5, 1979

Related U.S. Application Data

[63] Continuation-in-part of Ser. No. 365, Dec. 29, 1978, abandoned.

[51] Int. Cl.³ .................... B32B 5/16; B41M 5/16; B41M 5/22; C09D 11/00
[52] U.S. Cl. .................................. 282/27.5; 8/636; 8/637; 8/657; 106/21; 427/151; 427/212; 427/220; 428/307; 428/323; 428/403; 428/537; 428/914
[58] Field of Search .................... 106/21, 308 N; 282/27.5; 427/150, 151, 212, 215, 218, 220; 428/307, 403, 411, 537, 914, 323, 327; 8/636, 637, 657

[56] References Cited

U.S. PATENT DOCUMENTS

| 3,672,935 | 6/1972 | Miller et al. | 282/27.5 |
| 3,775,424 | 11/1973 | Farber | 544/350 X |
| 3,853,869 | 12/1974 | Farber | 544/350 |
| 3,894,168 | 7/1975 | Brockett et al. | 428/537 X |
| 3,911,195 | 10/1975 | Schmidt et al. | 428/537 X |

FOREIGN PATENT DOCUMENTS

| 2435640 | 2/1975 | Fed. Rep. of Germany | 282/27.5 |
| 49-118515 | 11/1974 | Japan | 282/27.5 |
| 50-003426 | 1/1975 | Japan | 282/27.5 |
| 50-005116 | 1/1975 | Japan | 282/27.5 |
| 1337924 | 11/1973 | United Kingdom | 282/27.5 |
| 1367569 | 9/1974 | United Kingdom | 282/27.5 |

Primary Examiner—Bruce H. Hess
Attorney, Agent, or Firm—Birch, Stewart, Kolasch & Birch

[57] ABSTRACT

A pressure-sensitive record material comprising the colorless chromogenic dye Pyridyl Blue mixed with and adsorbed onto a pigment which is coated on a substrate sheet, and capsules containing an acidic resin dissolved in a suitable solvent, the capsules being coated on the same or an additional sheet. This "reverse" system (where the acidic resin rather than the dye is encapsulated) provides an improved community of properties, including improved image strength, print stability (fade resistance) and resistance to degradation. Pyridyl Blue is a mixture of the isomers 7-(1-ethyl-2-methylindol-3-yl)-7-(4-diethylamino-2-ethoxyphenyl)-5,7-dihydrofuro[3,4-b]pyridin-5-one and 5-(1-ethyl-2-methylindol-3-yl)-5-(4-diethylamino-2-ethoxyphenyl)-5,7-dihydrofuro[3,4-b]pyridin-7-one.

23 Claims, No Drawings

PRESSURE-SENSITIVE RECORD MATERIAL

This application is a Continuation-in-Part of copending application Ser. No. 365, filed on Dec. 29, 1978, now abandoned.

BACKGROUND OF THE INVENTION

This invention relates to a pressure-sensitive record material. More particularly, the invention relates to a pressure-sensitive record system comprising a specific colorless chromogenic dye material, Pyridyl Blue, as defined hereinafter, mixed with and adsorbed onto a pigment which is coated onto a dyereceiving sheet along with the usual binder and other paper coating ingredients, and capsules containing an acidic resin dissolved in a suitable solvent, which capsules are coated on the same or an additional sheet.

DESCRIPTION OF THE PRIOR ART

Pressure-sensitive record materials employing colorless chromogenic compounds which form a mark when contacted with an acidic substance are well known in the art. Exemplary thereof are Crystal Violet Lactone (CVL) as described in Reissue patent No. 23,024 and the compouds disclosed in U.S. Pat. Nos. 3,509,173 (3,3-bis (1-ethyl-2-methylindol-3-yl) phthalide, also known as Indolyl Red) and 3,681,390 (2'-anilino-3'-methyl-6'-diethylaminofluoran, also known as N-102 dye).

Japanese application No. 48-29820, published as a Disclosure on Nov. 13, 1974, and Japanese application No. 48-53691, published as a Disclosure on Jan. 20, 1975, both disclose a colorless marking fluid employed in a pressure-sensitive record paper comprising a homolog of Pyridyl Blue and various solvents.

U.S. Pat. No. 3,894,168, which issued on July 8, 1975, discloses a "reverse" system analogous to that employed herein. This prior art, however, does not teach or suggest a reverse system with the use of the Pyridyl Blue dye material as disclosed in the present specification.

SUMMARY OF THE INVENTION

One of the objects of the present invention is to provide a "reverse" pressure-sensitive record system having an improved community of properties as compared with the systems taught in the prior art.

A specific object of the invention is to provide a colorless chromogenic system which imparts improved image strength, print stability (fade resistance) and resistance to degradation in a pressure-sensitive record material.

These and other objects and advantages of the present invention will become apparent to those skilled in the art from a consideration of the following specification and claims.

In accordance with the present invention, Pyridyl Blue, which is a mixture of the isomers 7-(1-ethyl-2-methylindol-3-yl)-7-(4-diethylamino-2-ethoxyphenyl)-5,7-dihydrofuro[3,4-b]pyridin-5-one, and 5-(1-ethyl-2-methylindol-3-yl)-5-(4-diethylamino-2-ethoxyphenyl)-5,7-dihydrofuro[3,4-b]pyridin-7-one, is mixed with and adsorbed onto a pigment such as calcium carbonate and the resulting dye precursor-coated pigment is coated on a dye-receiving sheet together with a suitable binder and the other usual paper coating ingredients. Capsules containing an acidic material, such as a para-phenyl-phenol-formaldehyde resin or a para-octylphenol-formaldehyde resin, dissolved in a solvent are coated on the same or an additional sheet. Coreaction between the colorless chromogenic dye material and acidic material released from said capsules by means of pressure produces a colored mark.

As noted above, the use of the Pyridyl Blue colorless chromogenic material of the invention imparts improved properties, for example, improved image strength, print stability (fade resistance) and resistance to degradation when compared to systems which employ, for instance, Crystal Violet Lactone in a similar reverse system.

DETAILED DESCRIPTION OF THE INVENTION

Formulations and techniques for the preparation of carbonless copy paper are well known in the art, for example, as disclosed in U.S. Pat. Nos. 3,627,581, 3,775,424 and 3,853,869. However, it is important to note that in the "reverse" system of the invention, the dye (adsorbed onto a pigment) is coated on a dye receptor (CF-coated front) sheet and the acidic resin dissolved in a solvent is enclosed within capsules, whereas the opposite is true in the usual carbonless copy paper transfer system.

The solvent for the acidic resin enclosed within the capsules can be any of those well known in the carbonless copy paper art, e.g., dibenzyl ether Magnaflux oil (saturated hydrocarbon oil, distillation range: 370°–500° F.)

benzyl benzoate 2,2,4-trimethyl-1,3-pentanediol diisobutyrate (TXIB; U.S. Pat. No. 4,027,065)

dibutyl phthalate 1,2,4-trimethyl benzene ethyldiphenyl methane (U.S. Pat. No. 3,996,405)

$C_{11}$-$C_{12}$ alkylbenzene isopropyl biphenyl (U.S. Pat. No. 3,627,581)

However, the most preferred is a mixed solvent of dibenzyl ether and Magnaflux oil.

Any water-insoluble and approximately chemically neutral pigments such as calcium carbonate, zinc oxide, barium sulfate, titanium oxide, barium carbonate, magnesium carbonate, calcium oxide, magnesium titanate and zinc sulfide can be employed in the present invention. Calcium carbonate is preferred.

In a typical formulation, Pyridyl Blue, a neutral pigment, at least one binder (e.g., a styrene-butadiene latex and/or starch) are admixed in water and coated on a CF sheet. Small amounts of conventional materials such as wetting agents and defoamers can also be employed in the formulation. When used in conjunction with the encapsulated acidic resin, either on the same or a separate sheet, an excellent pressure-sensitive record material is obtained.

The capsules for the acidic resin can be prepared from gelatin as described in U.S. Pat. No. 3,041,289, from a ureaformaldehyde polymer as disclosed in U.S. Pat. No. 4,001,140, from resorcinol-formaldehyde filled poly(vinyl alcohol) wall material capsules as described in U.S. Pat. No. 3,755,190, or from various melamine-formaldehyde polymers as disclosed in U.S. Pat. No. 4,100,103.

EXAMPLES OF THE INVENTION

The following examples are given merely as illustrative of the present invention and are not to be considered as limiting. Unless otherwise noted, the percentages in the examples and throughout the application are by weight.

The test results shown in the Examples were determined in the following manner.

In the Typewriter Intensity (TI) test, a standard pattern is typed on a CF-CB (coated front-coated back) pair. The reflectance of the printed area is a measure of color development on the CF sheet and is reported as the ratio of the reflectance of the printed area to that of the untyped area ($I/I_o$) and is expressed as a percentage. A high value indicates little color development and a low value indicates good color development. The faded print intensity is measured in the same manner.

Typewriter Intensity tests were also conducted before and after exposure of the print in various ways, including exposure at the noted times to fluorescent light, to natural sunlight, to ambient conditions and within an oven. The fluorescent light test device comprised a light box containing a bank of 18 daylight fluorescent lamps (21 inches long, 13 nominal lamp watts) vertically mounted on 1-inch centers placed 1½ inches from the sample being exposed. The wall exposure comprised exposure of the print by hanging the printed sheet on the laboratory wall for the noted times, exposed to air, natural and fluorescent room light, and ambient temperature and moisture levels.

The following procedures were used to prepare dye receiving CF sheets containing CVL (Crystal Violet Lactone) and Pyridyl Blue:

EXAMPLE 1

Dye precursor-coated neutral pigment particles (A) 1 gram of Pyridyl Blue was dissolved in 150 mls of acetone. 70 grams of precipitated $CaCO_3$, 20 grams of Cabolite 100 urea-formaldehyde resin pigment (U.S. Pat. No. 3,988,522) and 10 grams of ZnO (Green Seal 8 from New Jersey Zinc Co.) were blended in the above solution and the resulting dispersion was allowed to dry in a hood.

(B) 1 gram of CVL was dissolved in 150 mls of acetone. 70 grams of precipitated $CaCO_3$, 20 grams of Cabolite 100 and 10 grams of ZnO (Green Seal 8 from New Jersey Zinc Co.) were blended in the above solution and the resulting dispersion was allowed to dry in a hood.

Paper-coating slurry of dye precursor-coated pigment

The dye precursor-coated pigments (A) and (B) as described above were dispersed individually with the following materials:

|  | I | | | II | | |
|---|---|---|---|---|---|---|
|  | Parts Wet | Parts Dry | Dry % | Parts Wet | Parts Dry | Dry % |
| Pyridyl Blue pigment (A) | 84 | 84 | 83.4 | | | |
| CVL pigment (B) | | | | 84 | 84 | 83.4 |
| Penford Gum 260 (modified corn starch) | 100 | 10 | 9.9 | 100 | 10 | 9.9 |
| Dow Latex 620 (carboxylated styrene-butadiene latex) | 12 | 6 | 6.0 | 12 | 6 | 6.0 |
| Tamol 731 (25% solution of the sodium salt of a polymeric carboxylic acid, supplied by Rohm & Haas) | 3 | 0.75 | 0.7 | 3 | 0.75 | 0.7 |
| Water | 250 | — | — | 250 | — | — |
| Totals | 449 | 100.75 | 100.0 | 449 | 100.75 | 100.0 |

The above paper-coating slurries were coated on 34 pound bond paper with a No. 12 Mayer rod. After drying, the coating weight was about 4.5 pounds per ream of 500 sheets, measuring 25 by 38 inches.

EXAMPLE 2

Alternate method of manufacture of dye precursor-coated neutral pigment particles and pigment coated sheets (C) 300 grams of Pyridyl Blue, 600 grams of calcium carbonate, 300 grams of 10% solids Penford Gum 230 (modified corn starch), 1200 grams of water and 30 grams of 25% solids Tamol 731 were attritored for 45 minutes. A few drops of octanol were added, to reduce foaming.

(D) 300 grams of CVL, 300 grams of calcium carbonate, 300 grams of zinc resinate, 300 grams of 10% solids Penford Gum 230, 1200 grams of water and 30 grams of 25% solids Tamol 731 were attritored for 45 minutes. A few drops of octanol were added to reduce foaming.

These attritor grinds were used to formulate dye receiving sheet coating formulas having the following compositions:

|  | III | | | IV | | |
|---|---|---|---|---|---|---|
|  | Parts Wet | Parts Dry | Dry % | Parts Wet | Parts Dry | Dry % |
| Pyridyl Blue Grind (C) | 6.3 | 2.0 | 3.0 | | | |
| CVL Grind (D) | | | | 6.4 | 2.0 | 3.0 |
| $CaCO_3$ | 43.4 | 43.4 | 65.8 | 43.4 | 43.4 | 68.8 |
| Ansilex Clay (U.S. Pat. 3,586,523) | 9.9 | 9.9 | 15.0 | 9.9 | 9.9 | 15.0 |
| Penford Gum 230 | 66.0 | 6.6 | 10.0 | 66.0 | 6.6 | 10.0 |
| Dow Latex 620 | 8.0 | 4.0 | 6.0 | 8.0 | 4.0 | 6.0 |
| Calgon T (a fused sodium-zinc phosphate glass composition in powder form) | .1 | .1 | .1 | .1 | .1 | .1 |
| Water | 110.3 | — | — | 110.3 | — | — |
| Totals | 224.0 | 66.0 | 99.9 | 244.0 | 66.0 | 99.9 |
| Coating Solids | | 27% | | | 27% | |

-continued

| | III | | | IV | | |
|---|---|---|---|---|---|---|
| | Parts Wet | Parts Dry | Dry % | Parts Wet | Parts Dry | Dry % |
| Viscosity | | 58 cps | | | 57 cps | |

These coating slurries were applied to a 34 pound base sheet at a rate of 4.5 lbs. (500 sheets measuring 25 by 38 inches) with an air knife coater.

EXAMPLE 3

Preferred encapsulated acidic marking liquid

The following procedure was used to prepare phenolic resin transfer (CB) sheets to be used in conjunction with the dye receiving (CF) sheets described above:

(E) 1200 grams of para-phenylphenol resin (PPP resin) were dissolved in 3200 grams of dibenzyl ether and 1600 grams of Magnaflux oil. Sufficient heat and agitation were applied to effect solution. 200 grams of EMA 31 (ethylene-maleic anhydride copolymer with a molecular weight range of 75,000 to 90,000) was dissolved in 1800 grams of deionized water with sufficient heat and agitation to effect solution. The prepared EMA solution was diluted with 6000 grams of deionized water and the pH adjusted to 4.0 with 20% sodium hydroxide solution. The oil solution of PPP resin was then emulsified in the EMA water solution with a Cowles Dissolver at 25° C. Emulsification was continued until an average oil drop size of approximately 2 microns was attained. Total drop size distribution ranged from approximately 0.5 microns to 15 microns. The resulting emulsion was then transferred to a water bath controlled at 55° C. and with rapid agitation, 1000 grams of 80% Resloom 714 (etherified methylol melamine) diluted with 1000 grams of deionized water was added. The resulting mix was kept at 55° C. for 2 hours under constant agitation to effect capsule formation. After 2 hours, the temperature was allowed to slowly equilibrate with the ambient temperature. Agitation was continued for an additional 16 hours.

(F) An oil solution of 1400 grams of para-octylphenol resin (POP resin), 3200 grams of dibenzyl ether and 1600 grams of Magnaflux oil was prepared using sufficient heat and agitation to effect solution. This solution was then encapsulated using the procedure described above.

Coating slurries of the above capsules were prepared having the following composition:

| | V | | | VI | | |
|---|---|---|---|---|---|---|
| | Parts Wet | Parts Dry | Dry % | Parts Wet | Parts Dry | Dry % |
| PPP Capsules (E) | 26.60 | 12.50 | 71.4 | | | |
| POP Capsules (F) | | | | 27.30 | 12.50 | 71.4 |
| Stilt Starch | 3.20 | 3.12 | 17.9 | 3.20 | 3.12 | 17.9 |
| Stayco S Starch | 6.30 | .63 | 3.6 | 6.30 | .63 | 3.6 |
| Dow Latex 638 (carboxylated styrene-butadiene latex) | 2.50 | 1.25 | 7.1 | 2.50 | 1.25 | 7.1 |
| Water | 26.40 | — | — | 25.20 | — | — |
| Totals | 65.00 | 17.50 | 100.0 | 65.00 | 17.50 | 100.0 |
| Coating Solids | | 27% | | | 27% | |
| Viscosity | | 68 cps | | | 68 cps | |

These coating slurries were applied to a 34 lb. base sheet at a rate of 3.75 lbs. (500 sheets measuring 25 by 38 inches) with an air knife coater. In addition, formulation V was applied to the back side of 34 lb. base sheets having the first side coated with formulations III and IV, respectively, to make CFB (coated front and back) papers.

The CB, CFB and CF papers prepared above were placed in proper imaging sequence and typewriter images were produced thereon. The intensity of these images after print development (24 hours) was determined with an opacimeter. The images were then subjected to various exposures to determine (a) The stability of the imaged print (fade resistance) and (b) The ability of the dye containing receiving (CF) sheet to produce a new print after exposure (CF Decline Resistance), shown below as "New Print Intensity".

The CF sheets prepared in Example 1 produced the following test results:

48 Hour South Window Exposure Test. Imaging done with IBM Memory Typewriter using an "X" character:

| CB | CF | Original Intensity | Intensity After Exposure (Fade) | New Print Intensity |
|---|---|---|---|---|
| V | I | 40 | 41 | 65 |
| VI | I | 52 | 53 | 75 |
| V | II | 40 | 52 | 88 |
| VI | II | 56 | 74 | 96 |

The CF sheets prepared in Example 2 produced the following test results:

1. 48 Hour Fluorescent Light Box Exposure Test. Imaging done with IBM Executive Typewriter using 4-bar cross hatch character:

| CB | CF | Original Intensity | Intensity After Exposure (Fade) | New Print Intensity |
|---|---|---|---|---|
| V | III | 38 | 48 | 55 |
| V | IV | 51 | 74 | 78 |
| V/III CFB | | 49 | 51 | 56 |
| V/IV CFB | | 52 | 68 | 75 |

2. 3 week 140° F. oven exposure test. Imaging the same as in Test 1 above:

| CB | CF | Original Intensity | Intensity After Exposure (Fade) | New Print Intensity |
|---|---|---|---|---|
| V | III | 40 | 49 | 52 |
| V | IV | 48 | 49 | 75 |
| V/III CFB | | 48 | 45 | 51 |
| V/IV CFB | | 51 | 51 | 68 |

3. 9 week wall test (ambient conditions). Imaging done with a solid block character using an IBM Selectric typewriter:

| CB | CF | Original Intensity | Intensity After Exposure (Fade) | New Print Intensity |
|---|---|---|---|---|
| V | III | 32 | 42 | 44 |
| V | IV | 34 | 54 | 76 |
| V/III CFB | | 33 | 42 | 45 |

-continued

| CB | CF | Original Intensity | Intensity After Exposure (Fade) | New Print Intensity |
|---|---|---|---|---|
| V/IV | CFB | 35 | 55 | 76 |

4. 7 week wall test (ambient conditions). Imaging done as in Test 3 above

| CB | CF | Original Intensity | Intensity After Exposure (Fade) | New Print Intensity |
|---|---|---|---|---|
| V | III | 33 | 38 | 48 |
| VI | III | 44 | 56 | 54 |
| V | IV | 34 | 45 | 72 |
| VI | IV | 57 | 73 | 89 |

Therefore, when used as described herein and when compared with Crystal Violet Lactone at the same concentration, Pyridyl Blue shows the following characteristics:

Equivalent image strength with respect to CVL when imaged with PPP Resin solution.

Superior image strength with respect to CVL when imaged with POP Resin solution.

Superior print stability (fade resistance) with respect to CVL under all exposed tests.

Superior resistance to degradation (CF decline) with respect to CVL under all exposure tests.

In a typical procedure the Pyridyl Blue employed in the above examples is prepared in the following manner. A quantity of 58.0 g (0.188 mole) of (1-ethyl-2-methylindol-3-yl) (3-carboxypyridin-2-yl)ketone and its isomer is stirred for 2 hours at 60°–65° C. with 35.3 g (0.188 mole) of N,N-diethyl-m-phenetidine and 250 ml of acetic anhydride. The reaction mixture is poured into 500 ml of water and the acetic anhydride hydrolyzed by slowly adding 450 ml of 29% ammonium hydroxide. After stirring for 2 hours, the resulting solid is filtered. It is washed with water, 200 ml of 40% methanol/water and 50 ml of petroleum ether (b.p. 60°–110° C.). The solid is dried in a 75° C. oven to a constant weight of 80.5 g (90%) of the desired product, Pyridyl Blue, mp 134°–137° C.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A pressure-sensitive record sheet material which comprises a substrate coated with a water-insoluble, approximately chemically neutral pigment having Pyridyl Blue adsorbed thereon.

2. The record sheet of claim 1, wherein said pigment is calcium carbonate.

3. The record sheet of claim 1, further including at least one binder for said pigment in the coating.

4. The record sheet of claim 3, wherein said binder is starch.

5. The record sheet of claim 1, wherein said substrate is a paper sheet.

6. A pressure-sensitive record sheet material which comprises a substrate coated with a water-insoluble, approximately chemically neutral pigment having Pyridyl Blue adsorbed thereon, and pressure rupturable capsules containing an organic solvent solution of a resin reactive with Pyridyl Blue to form a colored mark.

7. The record sheet of claim 6, wherein said resin is a novolak resin.

8. The record sheet of claim 7, wherein said novolak resin is a para-phenylphenol-formaldehyde resin or a para-octylphenol-formaldehyde resin.

9. The record sheet of claim 8, wherein said pigment is calcium carbonate.

10. The record sheet of claim 6, further including at least one binder for said pigment in the coating.

11. The record sheet of claim 6, wherein said pigment having Pyridyl Blue adsorbed thereon and said pressure rupturable capsules comprise separate coatings on said substrate.

12. The record sheet of claim 6, wherein said pigment having Pyridyl Blue adsorbed thereon and said pressure rupturable capsules are interspersed on said substrate.

13. A pressure-sensitive record sheet material comprising a first substrate having a coating of pressure rupturable capsules containing an organic solvent solution of an acidic resin superimposed on a second substrate coated with a water-insoluble, approximately chemically neutral pigment having Pyridyl Blue adsorbed thereon, the two coatings being in contiguous juxtaposition.

14. The record sheet of claim 13, wherein said pigment is calcium carbonate.

15. The record sheet of claim 13, wherein the coating on said second substrate further includes at least one binder for said pigment.

16. The record sheet of claim 13, wherein said resin is a novolak resin.

17. The record sheet of claim 16, wherein said novolak resin is a para-phenylphenol-formaldehyde resin or a para-octylphenol-formaldehyde resin.

18. A manifold assembly comprising a plurality of coated first and second substrates as defined in claim 13.

19. Minute particles of a water-insoluble, approximately chemically neutral pigment having Pyridyl Blue mixed with and adsorbed thereon.

20. The minute particles of claim 19, wherein said pigment is calcium carbonate.

21. A paper coating slurry comprising water, a water-insoluble, approximately chemically neutral pigment having Pyridyl Blue adsorbed thereon, and at least one binder.

22. The paper coating slurry of claim 21, wherein said pigment is calcium carbonate.

23. The paper coating slurry of claim 21, wherein the binder is a styrene-butadiene latex.

* * * * *